United States Patent [19]

Boyer et al.

[11] Patent Number: 5,774,692
[45] Date of Patent: Jun. 30, 1998

[54] OUTER QUANTIFIERS IN OBJECT-ORIENTED QUERIES AND VIEWS OF DATABASE SYSTEMS

[75] Inventors: Philip L. Boyer; Gerald G. Kiernan, both of San Jose, Calif.

[73] Assignee: International Business Machines Corporation, Armonk, N.Y.

[21] Appl. No.: 539,662

[22] Filed: Oct. 5, 1995

[51] Int. Cl.$^6$ .................................................. G06F 17/30
[52] U.S. Cl. ........................................ 395/500; 395/680
[58] Field of Search .................................... 395/500, 602, 395/604, 605, 680, 601, 616; 364/282.1, 280.5, 283.4, 259, 259.1

[56] References Cited

U.S. PATENT DOCUMENTS

| | | | |
|---|---|---|---|
| 5,091,852 | 2/1992 | Leung et al. | 395/602 |
| 5,121,494 | 6/1992 | Dias et al. | 395/600 |
| 5,241,648 | 8/1993 | Cheng et al. | 395/600 |
| 5,301,317 | 4/1994 | Cadot | 395/602 |
| 5,367,675 | 11/1994 | Cheng et al. | 395/602 |
| 5,495,605 | 2/1996 | Lohman et al. | 395/604 |
| 5,590,324 | 12/1996 | Tsuchida et al. | 395/605 |

OTHER PUBLICATIONS

"Handling The Nulls Generated By Extended relational Operations", A. Larner, IBM Technical Disclosure Bulletin, vol. 34, No. 4A, Sep. 1991, pp. 331–339.
"Extensible Design For Generating Alternative Join Sequences In A Relational Query Optimizer", G. M. Lohman, K. Ono; IBM Technical Disclosure Bulletin, vol. 32, No. 11, Apr. 1990, pp. 317–318.
"Heuristic Method for Joining relational Data Base Tables", G. M. Lohman, IBM Technical Disclosure Bulletin, vol. 30, No. 9, Feb. 1988, pp. 8–10.
ISO–ANSI Working Draft: Database Language SQL2 and SQL3.

C. Date, Relational Database; Selected Writings, "The Outer Join," Chapter 16, Addison–Wesley Publishing Co. 1986.
"Object–Oriented Database Systems: Promise, Reality, and Future," Kim, Won, *Proc. 19th International Conference on Very Large Data Bases,* Dublin, Aug. 1993.
"A data Model and Query Language for EXODUS," *Proc. ACM–SIGMOD International Conference on Management of Data,* Carey, Michael; DeWitt, David; Vandenberg, Scott; Chicago, Jun. 1988.
"A model of Queries for Object–Oriented Databases," Kim, Won. *Proc. 15th International Conference on Very Large Data Basses,* Amsterdam, Aug. 1989.
"A query Language for the $O_2$ Object–Oriented Database System," Bancilhon, Francois; Cluet S.; Delobel, C.; *Proc. 2nd International Workshop on Database Programming Languages,* Hull, Richard; Morrison, Ron; Stemple, David, editors; Gleneden Beach, Jun. 1989, Morgan–Kaufmann Publishers, Inc.

(List continued on next page.)

*Primary Examiner*—Kevin J. Teska
*Assistant Examiner*—Dan Fiul
*Attorney, Agent, or Firm*—Marilyn Smith Dawkins

[57] ABSTRACT

The system, method, and program of this invention provides for a new type of quantifier that is useful for object-oriented queries that reference collections and nested collections of objects. The invention is applicable to any other type of database where the data has a hierarchical relationship, also. This new type of quantifier is called an outer quantifier. The outer quantifier appears in the language of the query (in the FROM clause) and creates a new runtime semantic. The function and semantics provided by outer quantifiers is similar to that provided partly by left outer joins in relational systems. Outer quantifiers are bound to a null instance if the collection over which they are defined is empty. Outer quantifiers are a simple way of expressing queries so that objects having empty collections of nested objects are included in the result, also.

18 Claims, 2 Drawing Sheets

OTHER PUBLICATIONS

"Query Processing in the ObjectStore Database System," Orenstein, Jack; Haradhvala, Sam; Margulies, Benson; Sakahara, Don; *Proc. ACM–SIGMOD International Conference on Management of Data,* San Diego, Jun. 1992.

"CQL++: A SQL for a C++ Based Object–Oriented DBMS," Dar, S.; Gehani, N.; Jagadish, H.; *Proc International Conference on Extending Data Base Technology,* Advances in Database Technology—EDBT '92. Lecture Notes in Computer Science, Vienna, 1992. Springer–Verlag.

"Querying Object–Oriented Databases," Kifer, Michael; Kim, Won; Sagiv, Yehoshua; *Proc. ACM–SIGMOD International Conference on Management of Data,* San Diego, Jun. 1992.

"Object Query Language," Chapter 4, Atwood, Tom; Duhl, Joshua; Ferran, Guy; Loomis, Mary; Wade, Drew; *Object Database Standards: ODMG—93 Release 1.1,* R.G.G. Cattell, editor, Morgan–Kaufmann Publishers, Inc., 1993.

"Experiences Building the Open OODB Query Optimizer," Blakeley, Jose; McKenna, William J.; Graefe, Goetz, *Proc. ACM SIGMOD International Conference on Management of Data,* Washington, D.C., May 1993.

"Observations on the ODMG–93 Proposal," Kim, W., *ACM SIGMOD Record,* 23(1), Mar. 1994.

"Outerjoin Optimization in Multidatabase Systems," Chen, A., *Proc. 2nd International Symposium on Databases in Parallel and Distributed Systems,* Dublin, Jul. 1990.

Microsoft. *Programmer's Reference, Microsoft Open Database Connectivity Software Development Kit,* 1992.

"Extensible/Rule Based Query Rewrite Optimization in Starburst," Pirahesh, H.; Hellerstein, J.; and Hasan, W.; Proc. 1990, herein incorporated by reference, *ACM SIGMOND Conf.,* Atlantic City, NJ, May 1990.

*Object Oriented Programing Using SOM and DSOM,* Christina Lau, Van Nostrand Reinhold, an International Thomson Publishing Company, 1994.

"Extending the Algebraic Framework of Query Processing to Handle Outerjoins", Rosenthal, A.; Reiner, D., *Proc, $10^{th}$ International Conference on Very Large Data Bases,* Singapore, Aug. 1984.

"Query Graphs, implementing trees, and freely–reorderable outer–joins", Rosenthal, Arnon; Galindo–Legaria, Cesar, *Proc. ACM–SIGMOD International Conference on Management of Data,* Atlantic City, May 1990.

"The Database Language GEM", Zaniolo, C., *Proc. ACM–SIGMOD International Conference on Management of Data,* San Jose, May 1983.

"An Implementation of GEM: Supporting a Semantic Data Model on a Relational Back–End", Tsur, S.; Zaniolo, C., *Proc. ACM–SIGMOD International Conference on Management of Data,* Boston, Jun. 1984.

OUTER QUANTIFIERS IN OBJECT-ORIENTED QUERIES AND VIEWS OF DATABASE SYSTEMS

CROSS REFERENCE TO RELATED APPLICATION

This application is related by common inventorship and subject matter to copending Patent Application No. ST9-95-044 entitled "Optional Quantifiers in Relational and Object-Oriented Views of Database Systems" filed on even date herewith, assigned to the Assignee hereof and entirely incorporated herein by this reference.

BACKGROUND OF THE INVENTION

1. Field of the Invention

The present invention relates to systems, methods, and computer programs in the field of database information retrieval, and, more specifically, for information retrieval from hierarchical structured databases including object-oriented databases.

2. Description of the Related Art

Relational databases are computerized information storage and retrieval systems. A relational database management system (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (DASD) such as magnetic or optical disk drives for semi-permanent storage.

Data may be retrieved from this type of database by a variety of methods. For example, a computer program, i.e., an application, can extract information from the database without human intervention, or a user can interact with a query system program which serves as a front-end to the database system. "Accessing a table" is used in the art to mean reading information from a table. Since the tables are normally stored on DASD, accessing a table requires transferring all or part of the table from DASD into the RAM of the computer system. When results of an operation are output, the results are either displayed to a user or stored in some form of memory in the computer (RAM, DASD, TAPE, etc.) for subsequent use.

The DBMS is structured to accept commands to store, retrieve, and delete data. The term query is used to refer to a set of commands to retrieve data from the DBMS. One widely used and well known set of commands is called the Structured Query Language (SQL). The current SQL standard is known informally as SQL/92. The definitions for SQL provide that a DBMS should respond to a particular query with a particular set of data given a specified database content, but the method that the DBMS uses to actually find the required information in the tables on the disk drives is left up to the DBMS. Typically there will be more than one method that can be used by the DBMS to access the required data. The DBMS will optimize the method used to find the data requested in a query in order to minimize the computer time used and, therefore, the cost of doing the query.

The terms "quantifier," "qualifier," and "range variable" are used in the same context and used synonymously, sometimes. In relational terms, they allow one to define an alias for a table. For example, in a table of employees, one can define two quantifiers, qualifiers, or range variables on that table. For example: In the FROM clause of a SQL query, one can specify:

from employee e1, employee e2

As such, e1 and e2 are quantifiers over the table of employees.

Views are SQL structures which provide a means for naming queries. Views are table expressions which specify tables, i.e., the table expressions have values that are derived from other tables. Views may make use of joins and other SQL capabilities.

When information is needed from a plurality of tables, the tables may be joined by the database software or firmware. Joins allow additional information to be obtained across tables in a meaningful way. A join operation joins together two tables on the basis of common values in a common column. A simple example would be a table of employee information which lists an employee's department number as "76," but where the definition of department "76" requires reference to another table, the Department table, which lists the full department title associated with each department number. In this second table, the row for department "76" also contains a column with the department title "Information Systems Department." Thus, a user desiring to generate a report containing a list of all employees including their department titles may want to establish a join relationship between the department number column in the Employee-table and the department title column in the Department-table, so that the employee's department can be printed in the title form instead of the numerical form. The above describes a natural join which will be referenced herein as merely a join. It should be noted that a join operation will not return results if there is not a matching value in the other table being joined for that tuple. For example, if department "76" was not in the Department table, no result would be returned for employees in department 76.

An outer join operation is an extended form of the join operation. It differs from the natural join in that tuples in one relation having no counterpart in the other appear in the result with nulls in the other attribute positions, instead of simply being ignored as they are in the natural join. A subcategory of the outer join operation is a left outer join. A left outer join joins two tables and one of the elements of the tables may not have a matching join value with the other table. However, a user may want a result with that element, anyway. For example, a user may want a result with departments and employees in each department. A left outer join on department will give all departments in the result whether or not there are any employees in that department, but the result will only have employees having departments. A user can switch the query around and do a left outer join on employees in order to get all employees whether or not they have departments, but this result will not have departments with no employees.

A left outer join operation was not a part of the original relational model, and it is very difficult and complicated to implement support for this function in a DBMS. Many commercial DBMSs do not provide such support. However, there are many requirements from customers to have this function. Customers desire to see an item in a result even though it may have an empty subset.

Several subcategories of the outer join operation, besides the left outer join, have also been defined, called full outer join, right outer join, and full natural outer join. Except for the full natural outer join, the rest are well defined only if two tables are specified in the FROM clause. The two tables are called left and right tables. If tuples of both tables (respectively, the left table or the right table) are preserved, the operation is called full (respectively, left, right) outer join.

Methods of performing a left outer join scan the outer table (at some stage) once and find the matching tuple of the inner table. At a given scan position, if no tuple of the inner table matches the outer tuple, the outer tuple is output with NULL values for the inner columns. Handling of the full outer join, which requires preserving the inner tuples also, is more involved. In the full outer join, preservation of the outer tuples can be done in the same way as the left outer join. The preservation of the inner tuples requires more work. The same is true for the right outer join. Note that although semantically a right outer join can be converted to a left outer join, this may not be desirable because it might be more expensive.

Ways of specifying and performing joins are the subject of substantial effort. Database tables can be very large and processing tables can be expensive in terms of computer resources.

In object-oriented databases (OODB), the database is organized into objects possibly having hierarchical relationships. The objects contain references, and collections of references, to other objects in the database, thus leading to databases with complex nested structures.

The integration of object technology and database systems has been an active area of research for the past decade. One important aspect of the integration of these two technologies is the provision of efficient, declarative query interfaces for accessing and manipulating object data. However, in the early days of OODB research, queries were given relatively little attention compared to other aspects of this technology. In "Object-Oriented Database Systems: Promise, Reality, and Future," Kim, Won, *Proc. 19th International Conference on Very Large Data Bases,* Dublin, August 1993, it is pointed out that even today, a number of commercial OODB systems are quite weak in this regard. As the OODB field has developed, however, a number of proposals for OODB query languages have appeared in the database literature including the following:

"A data Model and Query Language for EXODUS," *Proc. ACM-SIGMOD International Conference on Management of Data,* Carey, Mike; DeWitt, David; Vandenberg, Scott; Chicago, June 1988.

"A Model of Queries for Object-Oriented Databases," Kim, Won. *Proc. 15th International Conference on Very Large Data Basses,* Amsterdam, August 1989.

"A query Language for the $O_2$ Object-Oriented Database System," Bancilhon, Francois; Cluet S.; Delobel, C.; *Proc. 2nd International Workshop on Database Programming Languages,* Hull, Richard; Morrison, Ron; Stemple, David, editors; Gleneden Beach, June 1989, Morgan-Kaufmann Publishers, Inc.

"Query Processing in the ObjectStore Database System," Orenstein, Jack; Haradhvala, Sam; Margulies, Benson; Sakahara, Don; *Proc. ACM-SIGMOD International Conference on Management of Data,* San Diego, June 1992.

"CQL++: A SQL for a C++Based Object-Oriented DBMS," Dar, S.; Gehani, N.; Jagadish, H.; *Proc International Conference on Extending Data Base Technology,* Advances in Database Technology—EDBT '92. Lecture Notes in Computer Science, Vienna, 1992. Springer-Verlag.

"Querying Object-Oriented Databases," Kifer, Michael; Kim, Won; Sagiv, Yehoshua; *Proc. ACM-SIGMOD International Conference on Management of Data,* San Diego, June 1992.

"Object Query Language," Atwood, Tom; Duhl, Joshua; Ferran, Guy; Loomis, Mary; Wade, Drew; *Object Database Standards: ODMG—93 Release* 1.1, R. G. G. Cattell, editor, Morgan-Kaufmann Publishers, Inc., 1993.

"Experiences building the open oodb query optimizer," Blakeley, Jose; McKenna, William J.; Graefe, Goetz, *Proc. ACM SIGMOD International Conference on Management of Data,* Washington, D.C., May 1993.

While proposals outnumber actual implementations, several of these language designs have indeed been implemented as the query interfaces for significant commercial OODB products. See, "A query Language for the $O_2$ Object-Oriented Database System," Bancilhon, Francois; Cluet S.; Delobel, C.; *Proc. 2nd International Workshop on Database Programming Languages,* Hull, Richard; Morrison, Ron; Stemple, David, editors; Gleneden Beach, June 1989, Morgan-Kaufmann Publishers, Inc. See also, "Query Processing in the ObjectStore Database System," Orenstein, Jack; Haradhvala, Sam; Margulies, Benson; Sakahara, Don; *Proc. ACM-SIGMOD International Conference on Management of Data,* San Diego, June 1992.

The commercial OODB systems that are generally considered to have the best object query facilities are O2 (See, "A query Language for the $O_2$ Object-Oriented Database System," Bancilhon, Francois; Cluet S.; Delobel, C.; *Proc. 2nd International Workshop on Database Programming Languages,* Hull, Richard; Morrison, Ron; Stemple, David, editors; Gleneden Beach, June 1989, Morgan-Kaufmann Publishers, Inc.) and ObjectStore. (ObjectStore is a trademark of Object Design, Inc.)(See, "Query Processing in the ObjectStore Database System," Orenstein, Jack; Haradhvala, Sam; Margulies, Benson; Sakahara, Don; *Proc. ACM-SIGMOD International Conference on Management of Data,* San Diego, June 1992.) Each provide their own flavor of object query language. ObjectStore's query language is an extension to the expression syntax of C++. O2's query language is generally more SQL-like, and has been adapted into a proposed OODB query language standard (OODMG-93) by a consortium of OODB system vendors, but it differs from SQL in a number of respects. (See, "Object Query Language," Atwood, T.; Duhl, J.; Ferran, G.; Loomis, M.; and Wade, D.; *Object Database Standards:ODMG-93 Release* 1.1, Cattell, R. G. G., editor, Morgan-Kaufmann Publishers, Inc., 1993 and "Observations on the ODMG-93 Proposal," Kim, W., ACM SIGMOD Record, 23(1), March 1994.)

Furthermore, it should be noted that object/relational DBMSs support object oriented extensions of SQL, i.e., Illustra Relational Database System has object oriented features in it.

In OODBMs, quantifiers can be defined over embedded collections as well as root collections. Root collections are analogous to the notion of tables in SQL queries. Collections can also be nested within other collections. For example, each department in the collection called "Dept" has a member called "emps" that is the collection of employees in a department. Quantifiers over root collections are bound to each instance of the collection. For example, if quantifier $q_2$ is bound to the nested collection $q_1.m_1$ where $m_1$ is a multi-valued member in $q_1$, then the set of elements to which $q_2$ is bound varies for each instantiation of $q_1$. Nested quantifiers are dependent upon other quantifiers, and create an ordering in the declaration of quantifiers in a SQL FROM clause. For example, if quantifier $q_2$ is dependent upon $q_1$, then the declaration of $q_1$ must precede that of $q_2$. Quantifier $q_2$ is dependent upon $q_1$ if $q_1$ has a member that is the nested collection over which $q_2$ is defined. A quantifier $q_k$ is transitively dependent upon a quantifier $q_i$ if there is a quantifier $q_j$ over which $q_k$ is dependent an $q_j$ is dependent over $q_i$.

Explicit quantifiers are declared in the SQL FROM clause. Parentheses are used to declare nested collection in queries. For example, the query fragment from Dept d, (d.emps) e declares the quantifier d over the root collection Dept, and declares the quantifier e over the embedded collection d.emps. As stated above, for each tuple to which d is bound, the set of tuples for bindings for e changes. Similarly to root collections, multiple quantifiers can be declared for embedded collections. The following query fragment declares two quantifiers over the embedded collection d.emps.:

from Dept d, (d.emps) e1, (d.emps) e2

The embedded collection over which a quantifier is defined can be part of a path of any depth, possibly containing multi-valued data members and methods. The only restriction is that the leaf node of the path has to be a multi-valued data member. In the following code fragment, the quantifier e2 is declared over the set of employees in e1's department:

from Emp e1, (e1.dept..emps) e2

Nested quantifiers can be defined also over other nested quantifiers.

For a certain class or queries that involve objects and related objects, users require to retrieve objects irrespectively of the fact that they have related objects. For such queries, outer joins are used. See:

A. Rosenthal and D. Reiner, "Extending the Algebraic Framework of Query Processing to Handle Outerjoins". In *Proc. 10th International Conference on Very Large Data Bases*, Singapore, August 1984.

Arnon Rosenthal and Cesar Galindo-Legaria, Query graphs, implementing trees, and freely-reorderable outer-joins. In *Proc. ACM-SIGMOD International Conference on Management of Data*, Atlantic City, May 1990.

A. Chen, Outerjoin Optimization in Multidatabase Systems, In *Proc. 2nd International Symposium on Databases in Parallel and Distributed Systems*, Dublin, July, 1990.

For example, users might need to retrieve suppliers, and the products they supply. Join semantics return only suppliers who supply products, whereas left outer join semantics return all suppliers regardless of whether they supply any products.

Outer joins in relational systems are both complex to specify from the user's view point, and to implement from the database management system (DBMS) implementor's view point. An outer join is a very expensive operation in terms of computational costs. Also, an outer join is very complex and difficult to implement. Consequently, many commercial DBMSs, such as IBM's DB2, do not support outer join operators.

For example, the following query retrieves suppliers, along with the parts that they supply. Suppliers supplying no parts are excluded from the result.

select s.name, p.name
from Supplier s, Part p
where s.no=p.sno

It is assumed that a part is supplied by a single supplier. To retrieve additional suppliers who supply no parts, the join expression is changed to a left outer join expression, and is given the following query.

select s.name, p.name
from Supplier s, Part p
where s.no *=p.sno

In object-oriented database management systems (OODBMS), relationships among objects are not specified using joins and outer joins, but precomputed with pointers and embedded sets. For example, assuming that a part has a single supplier, a pointer based data member in Parts, say "supp" references a part's supplier, and the supplier's name is reached using a path expression. Note that these pointer based traversals naturally have outer joins semantics. (See, C. Zaniolo, "The Database Language GEM," *In Proc. ACM-SIGMOD International Conference on Management of Data*, San Jose, May 1983. See, also, S. Tsur and C. Zaniolo, "An Implementation of GEM: Supporting a Semantic Data Model on a Relational Back-End," In *Proc. ACM-SIGMOD International Conference on Management of Data*, Boston, June 1984.)

SUMMARY OF THE INVENTION

It is an object of this invention to take advantage of the hierarchical properties of some databases, including an object-oriented database, to provide a service having the important aspects of the functionality of a left outer join without incurring the difficulty of providing a left outer join implementation.

The system, method, and program of this invention provides for a new type of quantifier that is useful for object-oriented queries that reference collections and nested collections of objects. The invention is applicable to any other type of database where the data has a hierarchical relationship, also. This new type of quantifier is called an outer quantifier. The new property of this new type of quantifier has special semantics and runtime semantics. The outer quantifier appears in the language of the query (in the FROM clause) and thereby creates the new runtime semantic. The function and semantics provided by outer quantifiers is similar to that provided partly by left outer joins in relational systems.

For example, if there is a hierarchical relationship among quantifiers, as defined in object oriented databases, such as department has a set of employees, employees have a set of children, and children have a set of toys; a user can declare the quantifiers or aliases on any of these sets to be an outer quantifier. For example, if employee is declared as the outer quantifier, the result will show departments whether or not there are any employees in it. The runtime semantics provide that the result will appear whether or not it has any sub-components of the dependencies. In other words, if the set to which the quantifier is bound is empty, then the set will be replaced at runtime by a single entity set having a null value.

The present invention in a hierarchical database system is more restrictive than a left outer join in relational systems. In the present invention, only the parent of the nested collection can be on the left side. For example, a user can only request a result having departments whether or not they have employees, a user can not request a result having employees whether or not they have departments. However, this invention captures the essence of what is important to customers and users about left outer joins. The invention is simple in content, usage, and implementation, and is less costly in terms of computer resource, especially when compared to a left outer join in a relational database system.

Some other differences between this invention and left outer join operations are as follows. Outer quantifiers are declared in the FROM clause of a query while quantifiers in left outer joins are specified in an outer join predicate in the query. Also, in contrast with other quantifiers, outer quantifiers are bound to a null instance if the collection over which they are defined is empty. Outer quantifiers are a simple way of expressing queries over objects having nested collections of objects so that objects having empty collections of nested objects are included in the result, also. Outer quantifiers can be easily implemented using nested loops. Outer quantifiers are mapped to a special type of iterator that binds a quantifier to a null instance if the collection to which the quantifier is bound is empty.

Outer quantifiers can be declared on root collections (i.e., collections that are not embedded in other collections). Conversely to outer quantifiers over nested collections, outer quantifiers over root collections that are empty do not create results (i.e., are not bound to a single null instance). This achieves semantics that are similar to that of left outer joins. However, while outer quantifiers only impact quantifiers over nested collections, they can be specified at the root level for inheritance to the nested levels. For simplicity of use, root collections can be declared as outer so that the declaration need not be repeated at several nested levels. If a quantifier is labeled as an outer quantifier, then all quantifiers that are directly or transitively dependent upon it (i.e., quantifiers over nested collections) are also outer quantifiers, whether or not they have been declared as such.

Aside from offering users a useful and intuitive querying capability, outer quantifiers are easily implemented in the framework of an object-oriented query language in contrast to the difficulty of implementing left outer joins.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

The present invention is a new feature of OO-SQL. OO-SQL is an Object-Oriented Query Service for Object-Oriented Databases (OODB) and Object-Oriented Systems (OOS). In contrast to O2, ObjectStore, and ODMG-93, OO-SQL is an OODB query interface that provides an upward compatible extension to SQL/92. This enables programmers familiar with SQL to write OODB queries without learning an entirely new language. They merely learn about the object extensions. OO-SQL is an effective query language for interactive use from an interface in addition to being an effective embedded object query language for programs such as C++ programs. OO-SQL also enables the many tools that have been built for relational systems to access OODB data via interfaces such as ODBC (Microsoft. *Programmer's Reference, Microsoft Open Database Connectivity Software Development Kit,* 1992.)

An OO-SQL query engine allows extended SQL queries to be automatically generated and issued from a query browser interface called OO-SQL/QB, embedded in application programs or issued interactively from an interface. The query language supported by the engine is the complete SQL/92 select statement plus object extensions for navigating along paths and embedded structures, querying nested sets, and invoking member functions. OO-SQL includes an OODB view facility for defining views of OODBs and OOSs. An object-oriented SQL view facility allows one to define object-oriented views, and to define views that flatten complex OODB schemas, allowing direct access by existing tools designed to provide remote access to relational databases. These relational tools provide relational access to object-oriented (OO) data residing in OODBs and OOSs. The view facility also supports the definition of views that include reference and set-valued columns based on other views, thus allowing entire object-oriented view schemas to be created. OO-SQL provides the notion of view type that can be defined and then used to create views of multiple collections.

OO-SQL provides path expressions for the purpose of writing queries involving a navigational component. Path expression in OO-SQL permit traversal through embedded classes (and structures), pointers (and relationships), and collections. Traversal of embedded structures and references is supported via the operator ". . ." (instead of"."). An OO-SQL path expression can appear anywhere that a column can appear in SQL/92.

OO-SQL supports access to the elements both of top-level collection and nested collections. In addition, nested collections can appear in OO-SQL queries anywhere that SQL/92 permits the appearance of a subquery (i.e., a nested query).

In SQL/92, quantifiers range over top-level collection (i.e., relations) and are declared in the FROM clause. OO-SQL adds parentheses for declaring quantifiers over nested collections. For example, the following query selects the department name and employee numbers of the employees in department 1, yielding as many result tuples as there are employees in department 1:

select d.name, e.no
from Dept d, (d.emps) e where d.no=1;

This query declares a quantifier "d" to range over the root collection "Dept" and a quantifier "e" that ranges over the elements of the embedded collection "d.emps". During query evaluation, for each different object to which "d" is bound, the set of bindings for "e" changes.

OO-SQL includes features for dealing with inheritance (e.g., querying collections where the elements can be of a type or any of its subtypes) and with C++ methods. Inherited members can be specified in OO-SQL either implicitly, by merely giving the column name of the inherited member, or explicitly, by prefixing such members with the class name where they are defined (followed by the character pair "::"). Methods can appear anywhere a data member can appear, including path expressions.

The OODB view facility is based upon OO-SQL queries and on the use of relational-style query rewrite techniques. (See, "Extensible/Rule Based Query Rewrite Optimization in Starburst," Pirahesh, H.; Hellerstein, J.; and Hasan, W.; *Proc. 1990 ACM SIGMOD Conf.,* Atlantic City, N.J., May 1990.) The OODB view facility makes it possible for different users or user groups to have different perspectives on the same object data as with relational views. Also, having an OODB view facility makes it possible to make OODB data, which is usually stored as complex nested structures, appear as relational tables for access by legacy relational tools and applications.

Figure 1:
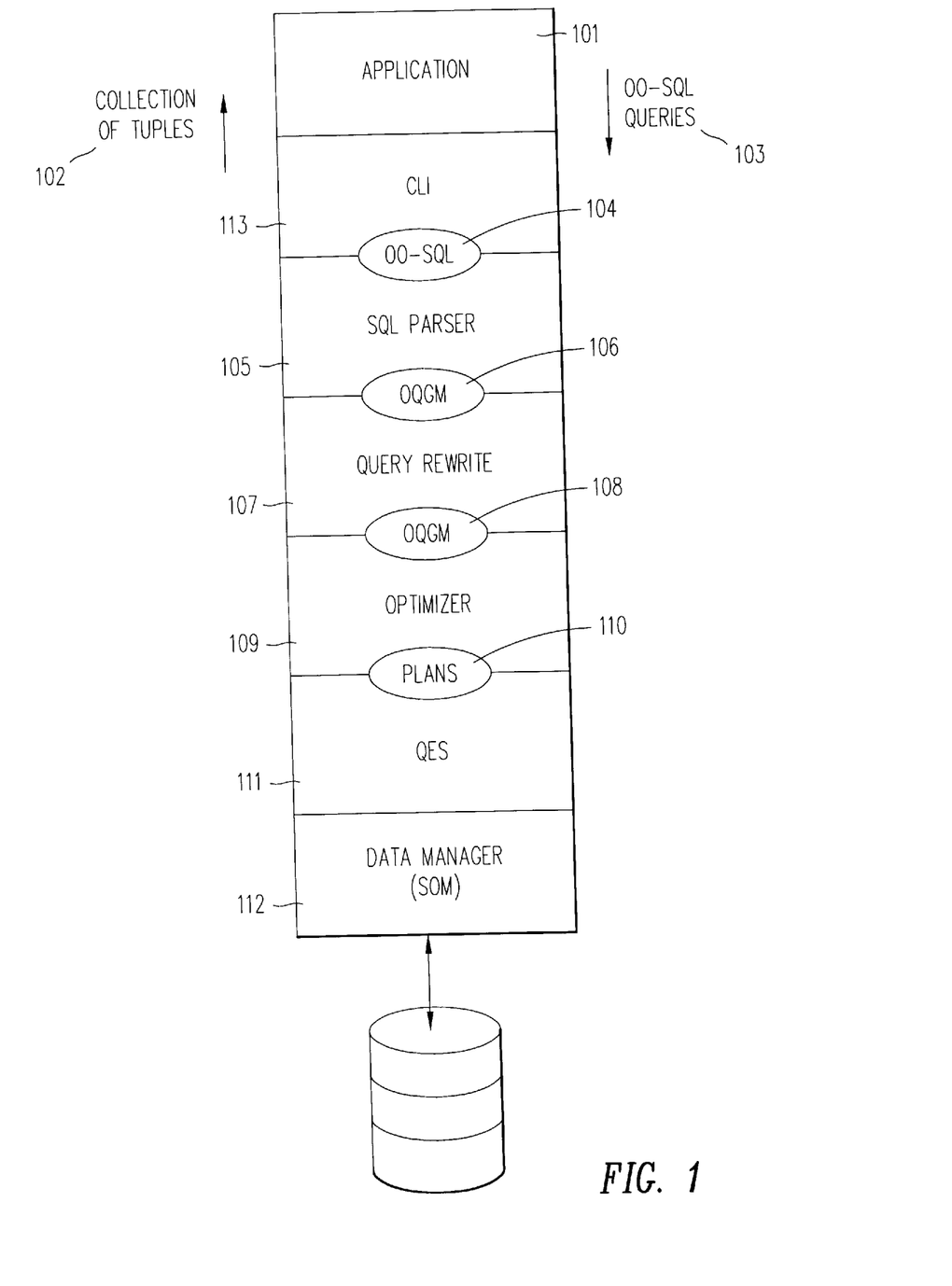
FIG. 1 is a functional block diagram of the system of the invention for processing a query having outer quantifiers over collections and nested collections of objects.

An OO-SQL query processing system is described as follows. A preferred embodiment has an implementation of OO-SQL that runs on top of SOM. SOM, which indicates System Object Model, is well known in the art as an object architecture. It is described fully in "Object Oriented Programming Using SOM and DSOM", Lau, Christina; *Van Nostrand Reinhold, an International Thomson Publishing Company,* 1994. In addition, OO-SQL can run on top of an Object-Store OODB system. FIG. 1 presents the framework for the implementation, which supports the integration of the OO-SQL engine with users' applications. The application 101 issues SQL queries 103 through a Call Level Interface (CLI). The SQL parser component 105 converts the query into an internal representation, i.e. a data structure OQGM (object query graph model) 106, 108 which is passed to the query rewrite component 107, and the query optimization component 109. Each query is then translated into an executable plan 110. Once translated, a query plan (QPL) 110 is passed to the Query Evaluation Subsystem, (QES) 111, which runs it against SOM collections of objects and returns an ordered collection of tuples 102 to the application. Query results can include pointers to objects in stored collections. These pointers are simply virtual memory addresses in an application program, so they must be valid pointers in the application program's workspace in order to be useable for further C++ based navigation and data manipulation.

The present invention was developed in the context of an Object Query Service, and is an enhanced feature of a SQL-based query access to an OODB system. Because the invention capitalizes on the hierarchical aspects of object-oriented databases, the invention is applicable, and easily adaptable to, other hierarchical databases, also. The invention could also be easily adapted to a relational database management system, albeit with some modifications and limitations obvious to those skilled in the art. The preferred embodiment described herein, however, will be with respect to an object-oriented database management system.

The system, method, and computer program of this invention can be readily understood by way of the following examples. First, the following query retrieves suppliers along with the parts that they supply.

select s.name, p.name
from Supplier s, (s.parts) p

In the above query, quantifier "s" is declared on suppliers and quantifier "p" is declared on the parts that "s" supplies. Suppliers is a root collection (i.e., the collection of suppliers is not embedded in any other collection), and parts is a nested collection (i.e., the collection of parts is embedded within the collection of suppliers). Therefore, the quantifier "s" is defined over the root collection Supplier, and the quantifier "p" is defined over the nested collection of parts embedded within each supplier. The quantifier "p" is called a nested quantifier. The collection to which "p" is bound varies for each binding of "s".

The query requests suppliers and the parts that they supply. If a supplier supplies no parts, that supplier will not appear in the result. This second query which follows, for which this invention provides, will include these partless suppliers.

select s.name, p.name
from outer Supplier s, (s.parts) p

The declaration of the collection of suppliers is prefixed with the "outer" keyword. The outer qualification applies for quantifier "s" and quantifiers that are directly or indirectly dependent upon "s" (e.g., quantifier "p"). Since "supplier" is designated as outer, and since "part" is dependent upon supplier, "part" is also outer. For convenience, the declaration can be made at the root level, and inherited at all sublevels, instead of repeating the "outer" designation at each sublevel.

Since "p" is an outer quantifier, if a part for a given supplier is empty, then "part" will be set to a singleton set having a null value. In the result, "supplier" will appear with a null value for the part name.

Although syntactically an outer quantifier has been designated on "supplier", the root collection, the "outer" functionality only applies to nested quantifiers and does not apply to any root quantifier. Consequently, this means that if the supplier set is empty, there will not be any results, i.e., no tuples are returned. Returning no tuples if the supplier set is empty is deemed to be more interesting semantics than returning a "null null" result. Obviously, this invention could be modified without undue experimentation to provide semantics that generate such a result. However, in the preferred embodiment of this invention, outer declarations have no effect on root collections. The declaration of an outer quantifier on a root collection is merely for convenience so that the outer designation does not have to be repeated at each sublevel. All outer quantifiers on nested collections can be inherited from the one outer designation on the root collection. Instead of specifying each dependency as outer, only one designation needs to be made at the root, although the semantics do not apply at the root level.

Figure 2:
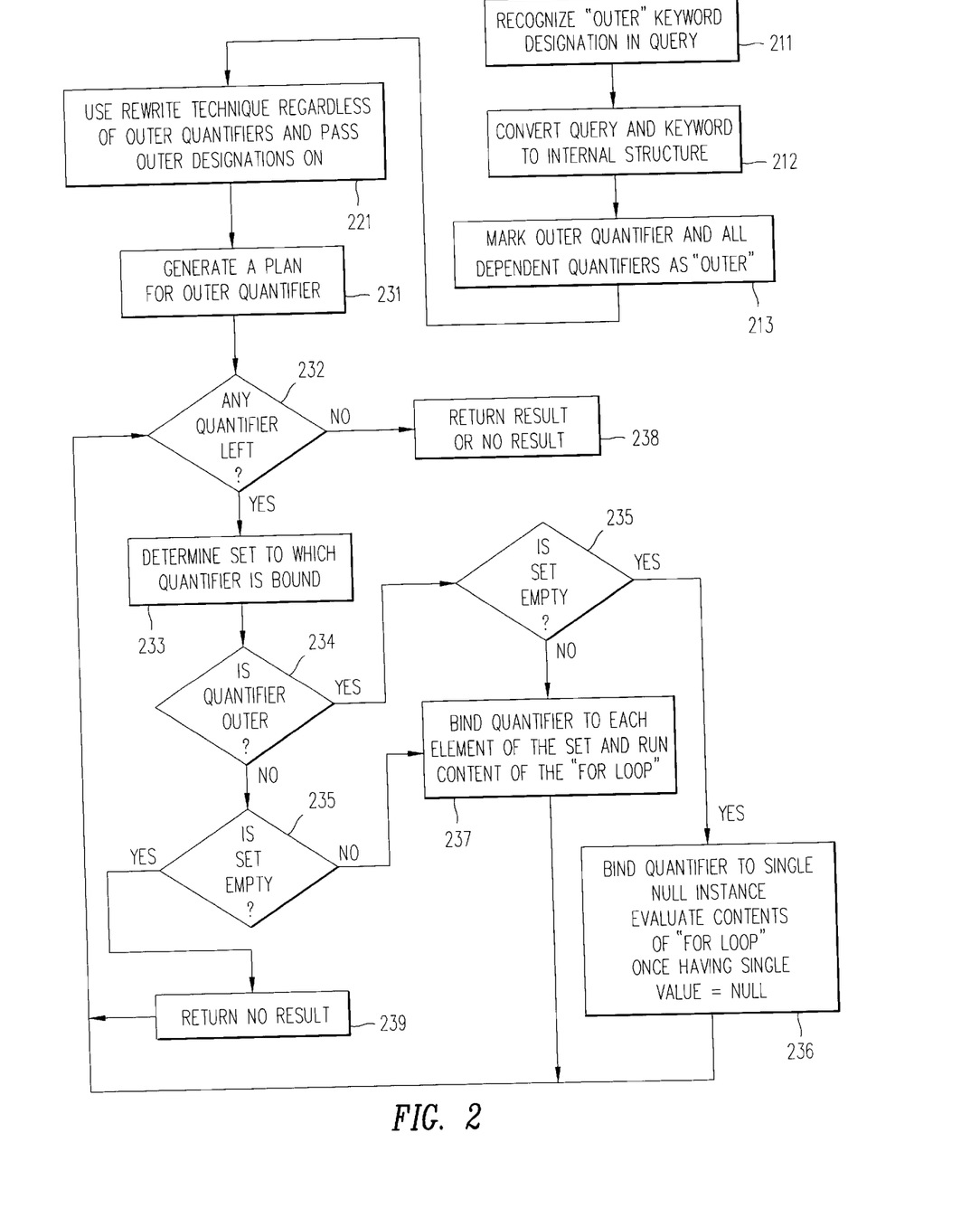
FIG. 2 is a functional block diagram of a flow chart illustrating the method for processing a query having outer quantifiers.

The mechanism, method, and program for implementing the invention is described with reference to FIG. 1 and FIG. 2. When a quantifier is designated as "outer" in a query by a user through an interface or by an application 101, the "outer" keyword designation is recognized in the query string, step 211, and converted to an internal format, step 212, by the parser 105. When the parser 105 builds the internal structure of the query, i.e., the object query graph model OQGM 106, the entity created for the quantifier is marked as outer. If the quantifier is marked as outer, then any quantifier dependent upon that one is systematically marked as outer whether or not it is in the query, step 213.

The query rewrite component is unaffected by a quantifier being designated as outer, i.e., the query rewrite component performs independently of an outer designation on any of the quantifiers. The "outer" keyword is merely propagated down through query rewrite which passes it on down to the optimizer, step 221. To process queries, standard relational query rewrite techniques are used that were developed for relational systems. For examples See, "Extensible/Rule Based Query Rewrite Optimization in Starburst," Pirahesh, H,; Hellerstein, J.; and Hasan, W.; Proc. 1990 ACM SIGMOD Conf. Atlantic City, N.J., May 1990.

Other than the parser recognizing the outer designation in a query and building the internal structure, i.e., the object query graph model (OQGM) to reflect this designation to all dependent quantifiers, the invention is mostly implemented and carried out at runtime. At runtime, the other step affected by an outer designation on a quantifier is the optimization step. The optimizer will generate a specific plan for a query including code fragments as illustrated below. If a quantifier is marked as outer, then the optimizer 109 generates a plan 110 that is different from the plan generated if the quantifier was not designated as outer. This is further discussed as follows.

Outer quantifiers can be easily implemented by taking advantage of nested loops. Each quantifier in a query is implemented using an iterator or cursor that loops through the set of elements in the collection to which it is bound. The first query shown above is implemented using the following query plan.

for all s in Supplier do begin
for all p in s.parts do begin
print (s.name, p.name)
end
end It should be noted that quantifiers over nested collections introduce a partial ordering among quantifiers. In the above example, since quantifier "p" is dependent upon quantifier "s", the iterator over "p" must appear within the scope of the iterator over "s". It should be noted that for a given binding of "s", if the collection of elements in "s.parts" is empty, no result is produced for that particular binding of s. The second query shown above is implemented using the following query plan.

for all s in Supplier do begin
    for all outer p in s.parts do begin
    print (s.name, p.name)
    end
    end The plan 110 that is generated for a query with outer quantifiers includes declarations to produce a singleton set if the set is bound to an empty set, step 231. For example, quantifier "p" is an outer quantifier. If the set of parts "s.parts" is an empty set, "p" is bound to a singleton set having one null value. The result will be a supplier name and a null value for the part name for that particular supplier. When the optimizer 109 generates the plan 110 for the query 103 having an quantifier designated as outer, the "for loops" are replaced with "for loops" marked with "outer" as shown above. The optimizer generates a plan such that the "for loop" will bind this quantifier to this set and that this quantifier is outer. The optimizer determines the set to which the quantifier is bound and whether the quantifier is an outer, steps 233, 234.

The plan 110 generated by the optimizer is then executed by the query evaluation subsystem (QES) 111 against the data manager managing the data in the database. The query evaluation subsystem (QES) 111 will check to see if the set for which the outer quantifier is bound is an empty set, step 235. If so, then the quantifier is bound to a singleton null value and the content of the "for loop" is evaluated once with that singleton value as null, step 236. If the set of elements to which the outer quantifier is bound is not an empty set, the outer quantifier variable is bound to each element and the content of the "for loop" is run, step 237.

In the second query above, since the iterator is declared as outer, the quantifier "p" is bound to a single null instance if the collection "s.parts" is empty, and only one iteration of the contents of the "for loop" is generated. As such, there is a direct mapping between the declaration of outer quantifiers, and their implementation as iterators in nested loops.

With reference to the "supplier part" examples above, this invention is applicable to the hierarchical data of supplier to part. Since in object oriented databases all of the data is interconnected and related, there is a far less likely need to perform join operations on data sets, and typically no need to perform full outer joins. As a result, the present invention as implemented in hierarchical databases is a light weight implementation and more straight forward than performing a full outer join.

Using the foregoing specification, the invention may be implemented using standard programming and/or engineering techniques. The resulting program(s), i.e., articles of manufacture, having computer readable program code means, may be stored on a computer usable memory such as disk, diskettes, memory cards ROM, tape, CD ROM, or any other memory device or embodied as electrical signals and transmitted over a communication link. For execution, the program may be copied into the RAM of the computer. User input may be received from the keyboard, mouse, pen, voice, touch screen, or any other means by which a human can input data to a computer, including through other programs such as application programs. One skilled in the art of computer science will easily be able to combine the software created as described with appropriate general purpose or special purpose computer hardware to create a computer system embodying the invention and to create a computer system for carrying out the method of the invention. While the preferred embodiment of the present invention has been illustrated in detail, it should be apparent that modifications and adaptations to that embodiment may occur to one skilled in the art without departing from the scope of the present invention as set forth in the following claims. For example, the invention has been described with reference to object-oriented database systems. However, the invention is also applicable to other hierarchical database systems. Also, the invention could be implemented in a computer system where the application and/or user, the storage device(s) containing the database, and the database management system are all or partly remote from each other and connected via a communication link.

We claim:

1. A method executed in a computer in a database management system for processing a query, said method comprising:

receiving said query having a quantifier defined over an entity, said quantifier having a special designation; and processing said query by returning a result set including the entity if the entity has an empty subset, as a consequence of said special designation.

2. The method of claim 1 further comprising:

receiving a second query having a second quantifier, without said special designation, defined over said entity; and returning no result with respect to said entity if the entity has an empty subset.

3. The method of claim 1 wherein the processing of said query is performed independently of an outer join operation.

4. The method of claim 1 wherein said special designation is an outer designation.

5. The method of claim 4 wherein the outer designation is in a FROM clause of the query.

6. The method of claim 1 wherein the quantifier is defined over at least one object having a nested collection and the result set includes the object if the nested collection of the object is empty.

7. The method of claim 1 wherein the database management system manages data having a hierarchical structure.

8. A method executed in a computer for processing object-oriented queries referencing at least one collection of at least one object, said collection having at least one nested collection, said method comprising:

receiving a query having a quantifier having a capability to have a special designation;

determining if said quantifier has said special designation;

binding, if said quantifier has said special designation, said quantifier to a null instance if the at least one nested collection is empty; and returning a result set including said collection even if each one of said at least one object has an empty nested collection.

9. A method executed in a computer for processing a query to a database having root collections of objects and nested collections of objects, said method comprising:

receiving a query designating a first quantifier over a root collection as being an outer quantifier;

marking a quantifier directly or indirectly dependent upon said first quantifier as being another outer quantifier, independently of an other specification of said another quantifier in a received query;

binding said another outer quantifier to a null value if a set to which said another outer quantifier is bound is empty; and returning a result from the processing of said query, the result including said object and said null value.

10. A method executed in a computer for processing a query to a hierarchical database, said method comprising:

receiving a query designating a first quantifier as being an outer quantifier;

converting an outer quantifier designation to an internal format having an indication that said first quantifier is designated as being outer and indicating that any other quantifier, dependent upon said first quantifier, is another outer quantifier;

rewriting said query independently of any indication that said first quantifier or other quantifier is outer;

generating a plan for processing the query, said plan having a declaration to produce a singleton set having a null value;

determining whether a quantifier is indicated as outer and a set to which said quantifier is bound;

determining whether the set to which said quantifier is bound is empty;

binding said quantifier to a null value and evaluating a content of the plan with said single null value if said set is determined to be empty and said quantifier is determined to be indicated as being outer; and binding said quantifier to each element of the set and running the content of the plan if the set is not empty.

11. A system for processing a query, said system comprising:

means for recognizing said query having a quantifier defined over an entity, said quantifier having a special designation; and means for processing said query by returning a result set including the entity if the entity has an empty subset, as a consequence of said special designation.

12. A system for processing object-oriented queries referencing at least one collection of at least one object, said collection having at least one nested collection, said system comprising:

means for receiving a query having a quantifier capable of having a special designation;

means for determining if said quantifier has said special designation;

means for binding, if said quantifier has said special designation, said quantifier to a null instance if the at least one nested collection is empty; and means for returning a result set including said collection even if each one of said at least one object has an empty nested collection.

13. A computer system having a database management system for managing hierarchical data, at least one storage device for storing said hierarchical data, and a communication link for receiving and sending data to at least one remote computer system for access to said hierarchical data, said computer system comprising:

means for receiving a query designating a first quantifier as being an outer quantifier;

means for converting an outer quantifier designation to an internal format having an indication that said first quantifier is designated as being outer and indicating that any other quantifier, dependent upon said first quantifier, is another outer quantifier;

means for rewriting said query independently of any indication that said first quantifier or other quantifier is outer;

means for generating a plan for processing the query, said plan having a declaration to produce a singleton set having a null value;

means for determining whether a quantifier is indicated as outer and a set to which said quantifier is bound;

means for determining whether the set to which said quantifier is bound is empty;

means for binding said quantifier to a null value and evaluating a content of the plan with said single null value if said set is determined to be empty and said quantifier is determined to be indicated as outer; and means for binding said quantifier to each element of the set and running the content of the plan if the set is not empty.

14. An article of manufacture comprising:

a computer usable medium having computer readable program code means embodied therein, the computer readable program code means comprising:

means for recognizing a query having a quantifier defined over an entity, said quantifier having a special designation; and means for processing said query by returning a result set including the entity if the entity has an empty subset, as a consequence of said special designation.

15. An article of manufacture comprising:

a computer usable medium having computer readable program code means embodied therein for processing object-oriented queries referencing at least one collection of at least one object, said collection having at least one nested collection, the computer readable program code means comprising:

means for recognizing a query having a quantifier designated as outer;

means for binding said quantifier to a null instance if the at least one nested collection is empty; and means for returning a result set including said collection even if each one of said at least one object has an empty nested collection.

16. An article of manufacture comprising:

a computer usable medium having computer readable program code means embodied therein for processing a query to a hierarchical database, the computer readable program code means comprising:

means for recognizing a query designating a first quantifier as being an outer quantifier;

means for converting an outer quantifier designation to an internal format having an indication that said first quantifier is designated as being outer and indicating that any other quantifier, dependent upon said first quantifier, is another outer quantifier;

means for rewriting said query independently of any indication that said first quantifier or other quantifier is outer;

means for generating a plan for processing the query, said plan having a declaration to produce a singleton set having a null value;

means for determining whether a quantifier is indicated as outer and a set to which said quantifier is bound;

means for determining whether the set to which said quantifier is bound is empty;

means for binding said quantifier to a null value and evaluating a content of the plan with said single null value if said set is determined to be empty and if said quantifier is determined to be indicated as being outer; and means for binding said quantifier to each element of the set and running the content of the plan if the set is not empty.

17. A method executed in a computer for querying a database, said method comprising:

submitting a query having a quantifier defined over an entity, said quantifier having a special designation; and receiving a result set including the entity if the entity has an empty subset, as a consequence of said special designation.

18. An article of manufacture comprising:

a computer usable medium having computer readable program code means embodied therein, the computer readable program code means comprising:

means for submitting a query having a quantifier defined over an entity, said quantifier having a special designation; and means for receiving a result set including the entity if the entity has an empty subset, as a consequence of said special designation.

* * * * *